US010819254B2

(12) United States Patent
Chretien et al.

(10) Patent No.: US 10,819,254 B2
(45) Date of Patent: Oct. 27, 2020

(54) DRIVE CIRCUIT FOR ELECTRIC MOTORS

(71) Applicant: Regal Beloit America, Inc., Beloit, WI (US)

(72) Inventors: Ludovic Andre Chretien, Columbia City, IN (US); Roger Carlos Becerra, Fort Wayne, IN (US)

(73) Assignee: REGAL BELOIT AMERICA, INC., Beloit, WI (US)

( * ) Notice: Subject to any disclaimer, the term of this patent is extended or adjusted under 35 U.S.C. 154(b) by 238 days.

(21) Appl. No.: 15/463,785

(22) Filed: Mar. 20, 2017

(65) Prior Publication Data

US 2018/0269810 A1 Sep. 20, 2018

(51) Int. Cl.
  *H02P 1/44* (2006.01)
(52) U.S. Cl.
  CPC .................... *H02P 1/445* (2013.01)
(58) Field of Classification Search
  CPC .......... H02P 21/02; H02P 21/04; H02P 23/02; H02P 23/03; H02P 1/44; H02M 2007/2195; H02J 7/247
  See application file for complete search history.

(56) References Cited

U.S. PATENT DOCUMENTS

| 4,398,097 | A | 8/1983 | Schell et al. |
| 4,992,721 | A * | 2/1991 | Latos ................. F02N 11/04 290/38 R |
| 5,023,469 | A | 6/1991 | Bassett et al. |
| 6,051,952 | A | 4/2000 | Moreira et al. |
| 6,121,749 | A | 9/2000 | Wills et al. |
| 6,163,129 | A * | 12/2000 | Younger .................. H02P 1/26 318/798 |
| 6,570,778 | B2 * | 5/2003 | Lipo ........................ H02P 1/44 318/807 |
| 6,801,013 | B2 | 10/2004 | Woodward et al. |
| 6,876,103 | B2 | 4/2005 | Radusewicz et al. |
| 6,952,088 | B2 | 10/2005 | Woodward et al. |
| 7,272,302 | B2 | 9/2007 | Woodward et al. |
| 7,336,003 | B2 | 2/2008 | Lathrop et al. |
| RE40,161 | E | 3/2008 | Panuce |
| 8,174,853 | B2 * | 5/2012 | Kane ..................... H02M 1/126 363/40 |
| 8,766,489 | B2 | 7/2014 | Lathrop |
| 8,853,992 | B2 * | 10/2014 | Boom .................... H02P 23/02 318/727 |
| 2009/0179498 | A1 | 7/2009 | Lathrop et al. |
| 2009/0218962 | A1 * | 9/2009 | Kubal ...................... H02P 1/30 318/102 |

(Continued)

FOREIGN PATENT DOCUMENTS

GB          2054295 A   *  2/1981   .............. H02J 3/42

*Primary Examiner* — Bickey Dhakal
(74) *Attorney, Agent, or Firm* — Armstrong Teasdale LLP

(57) ABSTRACT

A drive circuit for a permanent split capacitor (PSC) motor includes an inverter, a solid state switch, and a contactor coupled in parallel with the solid state switch. The inverter is configured to supply variable frequency current to the PSC motor over a first duration. The solid state switch is configured to supply line frequency current to the PSC motor at the expiration of the first duration. The contactor is configured to supply the line frequency current to the PSC motor over a second duration beginning when the contactor closes after expiration of the first duration.

18 Claims, 3 Drawing Sheets

(56) References Cited

U.S. PATENT DOCUMENTS

2016/0254763 A1* 9/2016 Hong ................ H02P 1/30
                                                    318/461
2017/0077857 A1   3/2017 Chretien et al.

* cited by examiner

US 10,819,254 B2

DRIVE CIRCUIT FOR ELECTRIC MOTORS

BACKGROUND

The field of the disclosure relates generally to a drive circuit for an electric motor, specifically a permanent split capacitor (PSC) motor and, more specifically, a drive circuit that enables synchronized transfer to line frequency power under load.

At least some known PSC motors are fixed speed motors that operate most efficiently at line frequency power. Such PSC motors exhibit uncontrolled acceleration during startup. Further, at low load conditions, such PSC motors operate less efficiently. Alternatively, a PSC motor may be driven with a variable speed motor controller to adapt motor speed to a load level. Such configurations are generally limited by power factor, electromagnetic interference, and electrical losses.

A drive circuit for PSC motors enables efficient operation at both high and low load conditions. For example, a PSC motor operating a compressor in a heating, ventilation and air conditioning (HVAC) system may experience high load conditions during peak temperatures and low load conditions during milder temperatures. The drive circuit operates the PSC motor using an inverter under low load conditions, and operates the PSC motor using line frequency power under high load conditions.

When starting up a compressor, the load on the PSC motor is generally low and builds over time as suction and discharge pressures increase the torque demand on the PSC motor. The starting torque output of the PSC motor, at line frequency power, for example, is generally higher than the torque load at startup. Conversely, when a compressor has been operating for some time, suction and discharge pressures may build up that produce a torque load that exceeds the starting torque output, thus preventing the PSC motor from turning, i.e., a locked rotor or a stalled compressor. At least some system controllers for PSC motors include an interlock that prevents restarts of the PSC motor until pressures have equalized in the compressor, thereby relieving the starting torque load. Such interlocks may be on the order of minutes in duration, during which the compressor cannot operate.

BRIEF DESCRIPTION

In one aspect, a drive circuit for a PSC motor is provided. The drive circuit includes an inverter, a solid state switch, and a contactor coupled in parallel with the solid state switch. The inverter is configured to supply variable frequency current to the PSC motor over a first duration. The solid state switch is configured to supply line frequency current to the PSC motor at the expiration of the first duration. The contactor is configured to supply the line frequency current to the PSC motor over a second duration beginning when the contactor closes after expiration of the first duration.

In another aspect, a PSC motor is provided. The PSC motor includes a plurality of windings and a drive circuit. The drive circuit is coupled to the plurality of windings. The drive circuit includes an inverter, a solid state switch, and a contactor coupled in parallel with the solid state switch. The inverter is configured to supply variable frequency current to the plurality of windings when the inverter is enabled. The solid state switch is configured to supply line frequency current to the plurality of windings after the inverter is disabled and before the variable frequency current decays from the plurality of windings and before motor speed falls below a threshold speed. The contactor is coupled in parallel with the solid state switch and configured to supply the line frequency current to the plurality of windings after the inverter is disabled.

In yet another aspect, a method of operating a PSC motor is provided. The method includes supplying a variable frequency current to windings of the PSC motor. The method includes disabling supply of the variable frequency current. The method includes closing a solid state switch after disabling supply of the variable frequency current to supply line frequency current to the windings before the variable frequency current in the windings decays below a current threshold and before a motor speed falls below a threshold speed. The method includes closing a contactor after disabling supply of the variable frequency current to supply the line frequency current to the windings. The method includes opening the solid state switch after the contactor is closed.

DETAILED DESCRIPTION

Figure 1:
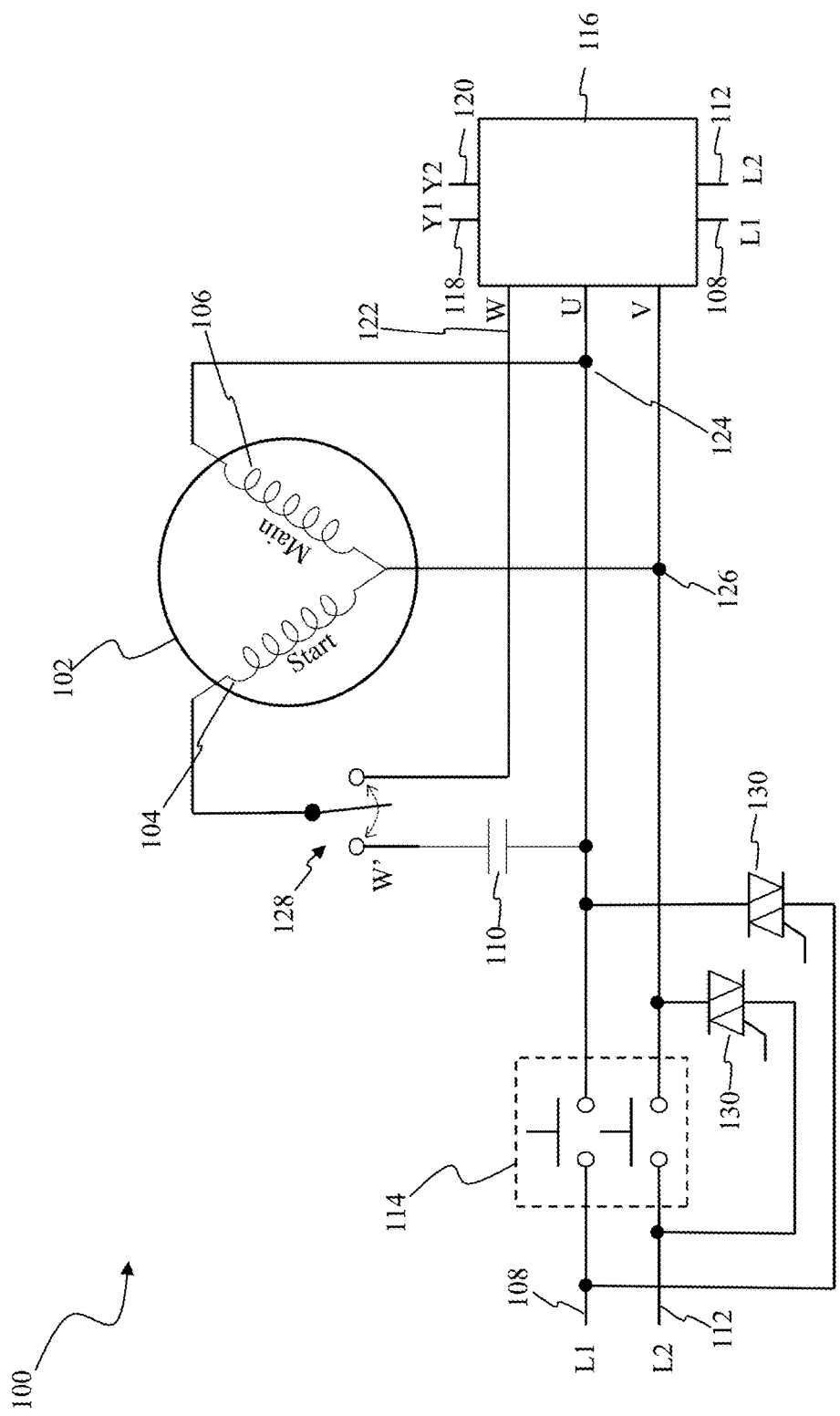
FIG. 1 is a schematic diagram of an exemplary drive circuit for a PSC motor.

As used herein, an element or step recited in the singular and preceded with the word "a" or "an" should be understood as not excluding plural elements or steps, unless such exclusion is explicitly recited. Furthermore, references to "example implementation" or "one implementation" of the present disclosure are not intended to be interpreted as excluding the existence of additional implementations that also incorporate the recited features.

In operating a compressor, a drive circuit for an electric motor, such as a PSC motor, drives the electric motor with an inverter under low load conditions and with line frequency power under high load conditions. Generally, the inverter and line frequency power cannot both be connected to the electric motor at the same time, because of the potential for a line-to-line short circuit. To transition from inverter to line, or line to inverter, one is disconnected before connecting the other. However, it is realized herein, while the inverter can be disconnected in microseconds, the contactor regulating line frequency power to the electric motor can require up to two line cycles, or approximately 16-32 milliseconds (ms), to open or close. Consequently, during transitions from inverter to line or line to inverter, current through the electric motor may decay to zero, leading to a motor stop. Motor speed may decay below a threshold speed within a single line cycle. In some electric motors, the threshold speed may be zero, while for other electric motors, the threshold speed may be above zero. When transitioning from line frequency power to the inverter, the starting torque output available through the inverter generally exceeds the load torque on the electric motor and is limited typically only by the current ratings of the switching components of the inverter. Speed decay is not a problem during such a transition. However, when transitioning from the inverter to line frequency power, the starting torque output at line frequency power may fall below the torque demand from the compressor. Under such conditions, the compressor can stall, i.e., winding current, motor speed, and motor torque decay within a single line cycle, or approximately 16 ms. It is further realized herein the typical interlock duration for restarting a electric motor operating a compressor is too long for the electric motor to transition between operation with the inverter to operation at line-frequency power for effective system operation.

Generally, replacing the contactor regulating line frequency power to the electric motor with faster solid state switches is cost-prohibitive in terms of efficiency and thermal management. For example, a typical two pole contactor might consume 12 watts of power, while a suitable solid state substitute, such as, for example, a triode for alternating current (TRIAC), would consume 50 watts. It is realized herein that solid state switches wired in parallel to the contactor poles for transitioning between the inverter to line frequency power enable seamless transition without the disadvantages of complete replacement of the contactor.

It is further realized herein the solid state switches may be limited to conduction for the several line cycles until the contactor closes. Due to rotor slip when the electric motor accelerates to line frequency, the motor current demanded may exceed normal full load motor current demand by up to an order of magnitude for a brief period of time. Accordingly, it is realized herein, the solid state switches should be capable of conducting peak currents for several line cycles at higher levels than normal operating current. Such solid state switches may include, for example, TRIACs, insulated gate bipolar transistors (IGBT), and any other suitable bidirectional solid state switch. It is realized herein the solid state switches can close within 3 ms and, in certain embodiments, within 1 ms and, notably, before winding currents decay below a current threshold, which avoids the potential for the compressor to stall during the transition from the inverter to line frequency power. Such a current threshold is generally defined by the torque required to turn the motor given a certain load and motor speed. For example, in certain embodiments, the current threshold may range from zero to 60 amperes depending on motor load and motor speed.

FIG. 1 is a schematic diagram of an exemplary drive circuit 100 for a PSC motor 102. PSC motor 102 includes a start winding 104 and a main winding 106. During normal line frequency operation, line frequency current, such as 50 Hertz or 60 Hertz, for example, is supplied on a first line, or L1, 108 to start winding 104 through a capacitor 110, and to main winding 106. A second line, or L2, 112 provides a return, or neutral, for the line frequency current. Drive circuit 100 includes a contactor 114 for connecting and disconnecting L1 and L2 to PSC motor 102. Contactor 114 is a two pole mechanical contactor that is commutated by energizing a coil (not shown). In certain embodiments, capacitor 110 may be coupled to L1 on either side of contactor 114.

Drive circuit 100 includes an inverter 116 that is enabled to drive PSC motor 102 with variable frequency power under low load, or at least less than full load, conditions. Inverter 116 is supplied line frequency power on L1 and L2, and is controlled over control lines 118 and 120, or Y1 and Y2. In alternative embodiments, inverter 116 may be controlled by any other suitable means, including, for example, digital control signals and analog control signals. Inverter 116 enables variable speed operation of PSC motor 102 by regulating phase and frequency of alternating current (AC) voltages on output terminals W, U, and V. Terminal W is coupled to a node 122, terminal U is coupled to a node 124, and terminal V is coupled to a node 126. Drive circuit 100 includes a bypass switch 128 that enables bypass of capacitor 110 during operation through inverter 116. When driven by inverter 116, main winding 106 of PSC motor 102 is coupled across nodes 122 and 126, i.e., terminals W and V of inverter 116, and start winding 104 is coupled across nodes 124 and 126, i.e., terminals U and V of inverter 116.

When operating PSC motor 102 using inverter 116, contactor 114 is open and inverter 116 is enabled via control lines 118 and 120, or other suitable control means. To transition to line frequency power, inverter 116 is disabled and contactor 114 is closed to couple L1 and L2 directly to PSC motor 102. Contactor 114 may require one to two line cycles to close. Drive circuit 100 includes solid state switches 130 coupled in parallel with the two poles of contactor 114 on L1 and L2. During the transition from inverter 116 to line frequency power, and after inverter 116 is disabled, solid state switches 130 are closed to couple L1 and L2 directly to PSC motor 102 in as few as 1 ms, thereby avoiding a potential locked rotor due to loading on and stalling of PSC motor 102. Solid state switches 130 remain closed and conduct line frequency current until contactor 114 is closed. Once contactor 114 is closed, solid state switches 130 are opened to redirect the line frequency current through contactor 114.

Figure 2:
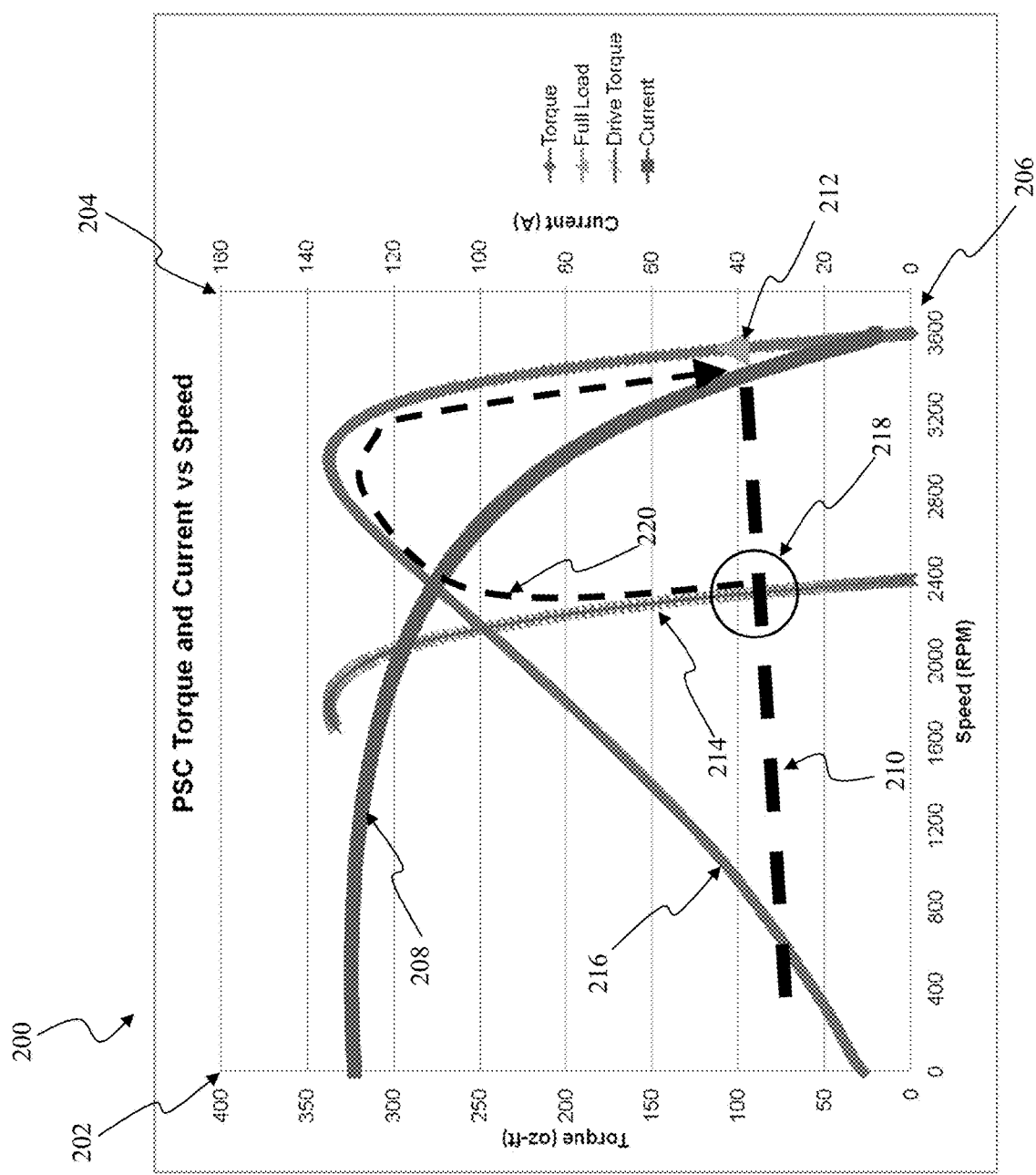
FIG. 2 is a graph of exemplary torque, speed, and current curves for a PSC motor.

FIG. 2 is a graph 200 of torque, speed, and current for a PSC motor, such as PSC motor 102, shown in FIG. 1. Graph 200 includes a left vertical axis 202 representing torque in ounce-feet (oz-ft), ranging from zero ounce-feet to 400 ounce-feet. Graph 200 includes a right vertical axis 204 representing current supplied to the PSC motor in Amperes (A), ranging from zero Amperes to 160 Amperes. Graph 200 includes a horizontal axis 206 representing speed of the PSC motor in rotations per minute (RPM), ranging from zero RPM to above 3600 RPM.

Graph 200 includes a current curve 208 that represents the current demanded by the PSC motor versus the motor speed. Current curve 208 is relatively high and flat as the motor starts and builds speed. Demanded current falls as motor speed increases, falling gradually at lower speeds and falling with an increasing negative slope as motor speed increases.

Graph 200 includes a full-load torque curve 210 representing the peak torque demand on the PSC motor versus motor speed when operating the system. Full-load torque curve 210 is based on the PSC operating at full capacity and at line frequency power. Full-load torque curve 210 further defines a peak torque value 212, represented as a triangle on full-load torque curve 210.

Graph 200 includes a torque curve 214 that represents the torque output of the PSC motor while being driven by an inverter in a drive circuit, such as, for example, drive circuit 100 and inverter 116, shown in FIG. 1. Torque curve 214 illustrates operation of the PSC motor at speeds no greater than 2400 RPM, and producing high levels of torque output.

Graph 200 includes a torque curve 216 that represents the torque output of the PSC motor while being driven at line frequency power. Torque curve 216, notably, operates with little torque output when starting from zero RPM. Torque curve 216 and full-load torque curve 210 illustrate, at low speeds, the torque output of the PSC motor is below full-load torque curve 210. As motor speed increases, torque curve 216 is relatively linear until its peak around 3000 RPM, above which torque output declines rapidly.

Figure 3:
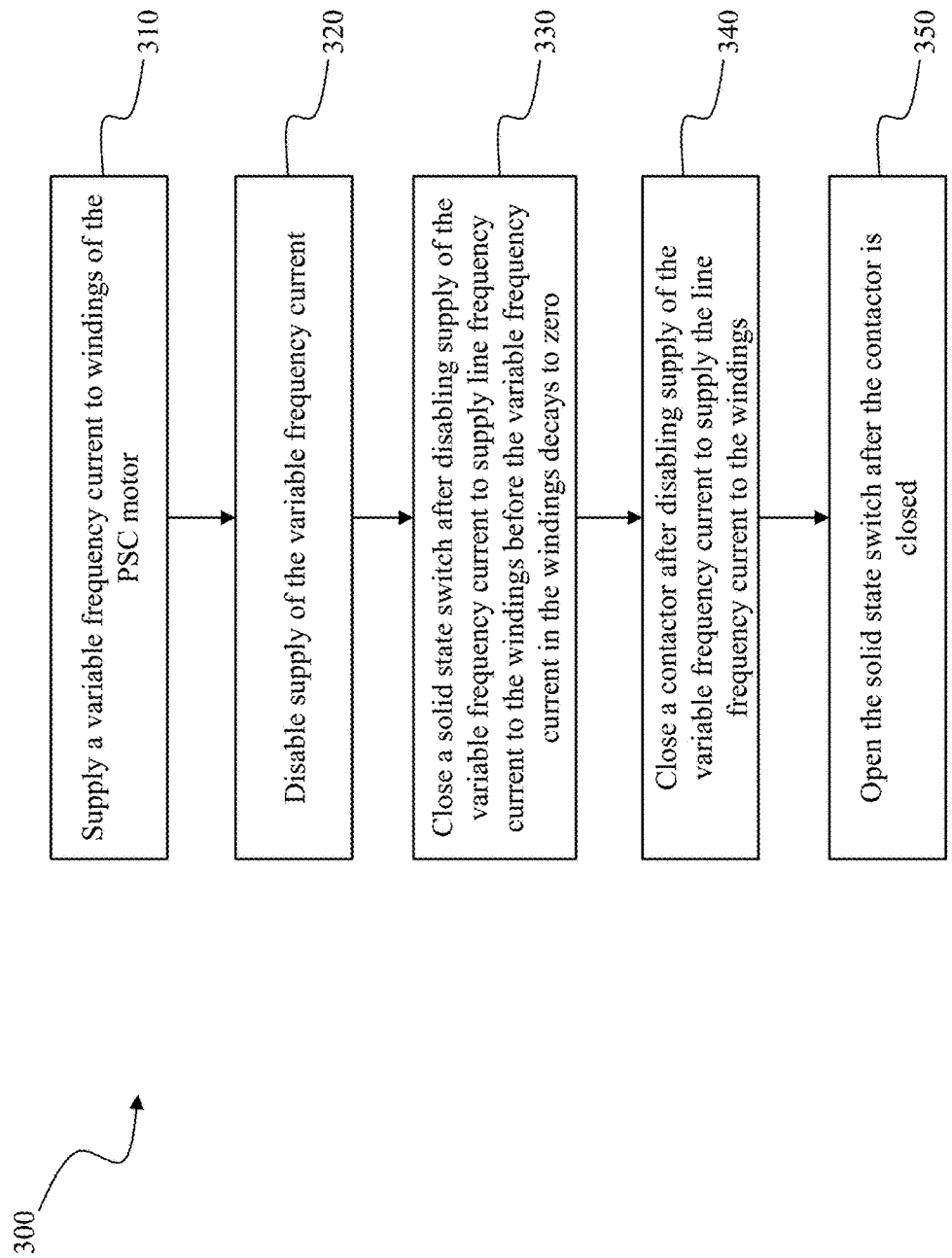
FIG. 3 is a flow diagram of an exemplary method of operating a PSC motor.

FIG. 3 is a flow diagram of an exemplary method 300 of operating PSC motor 102, shown in FIG. 1. More specifically, method 300 transitions operation of PSC motor 102 from being driven by inverter 116 to being driven at line frequency power through contactor 114. Method 300 begins with supplying 310 variable frequency current to windings 104 and 106 of PSC motor 102. Torque output of PSC motor 102 follows torque curve 214 until PSC motor 102 reaches a desired speed, represented by the intersection 218 of torque curve 214 and full-load torque curve 210. Intersection 218 further represents the point for PSC motor 102 to transition from being driven by inverter 116 to being driven by line frequency power.

Referring to FIGS. 1-3, during the transition, the variable frequency current output from inverter 116 is disabled 320. In one embodiment, the variable frequency current output of inverter 116 can be disabled in as little as, for example, 1 microsecond. The current conducted through windings 104 and 106 begins to decay until solid state switches 130 are closed 330, thereby supplying line frequency current to windings 104 and 106 through contactor 114. Current in windings 104 and 106 may decay to zero in as little as one cycle of the line frequency current, or approximately 16 ms. Solid state switches 130 close before the current decay in windings 104 and 106 reaches zero. In one embodiment, solid state switches 130 include TRIACs that can close in 1 ms or less. Upon supply of line frequency current to windings 104 and 106, PSC motor 102 accelerates along a transition torque curve 220 until peak torque 212 is reached on full-load torque curve 210.

Once inverter 116 is disabled and line frequency current is supplied to windings 104 and 106 through solid state switches 130, contactor 114 is closed 340 to supply the line frequency current through contactor 114 instead of solid state switches 130. Solid state switches 130 are then opened 350 after contactor 114 is closed. In certain embodiments, contactor 114 includes a mechanical contactor that requires up to two cycles of line frequency current to commutate, notably much slower than solid state switches 130.

The methods and systems described herein may be implemented using computer programming or engineering techniques including computer software, firmware, hardware or any combination or subset thereof, wherein the technical effect may include at least one of: (a) seamless transition from inverter driven PSC motor to line frequency power; (b) reducing duration of high-current conduction through solid state switching through use of parallel contactor and solid state switch configuration; (c) reducing switching of contactor under load; (d) avoiding interlock for startup of PSC motor; (e) enabling full load starting of the PSC motor due to avoidance of the starting torque demand limits; (f) reducing inrush current when transitioning to line frequency power directly from the inverter versus from startup; and (g) improving redundancy with respect to the contactor regulating line frequency power.

Some embodiments involve the use of one or more electronic or computing devices. Such devices typically include a processor, processing device, or controller, such as a general purpose central processing unit (CPU), a graphics processing unit (GPU), a microcontroller, a reduced instruction set computer (RISC) processor, an application specific integrated circuit (ASIC), a programmable logic circuit (PLC), a field programmable gate array (FPGA), a digital signal processing (DSP) device, and/or any other circuit or processing device capable of executing the functions described herein. The methods described herein may be encoded as executable instructions embodied in a computer readable medium, including, without limitation, a storage device and/or a memory device. Such instructions, when executed by a processing device, cause the processing device to perform at least a portion of the methods described herein. The above examples are exemplary only, and thus are not intended to limit in any way the definition and/or meaning of the terms processor, processing device, and controller.

In the embodiments described herein, memory may include, but is not limited to, a computer-readable medium, such as a random access memory (RAM), and a computer-readable non-volatile medium, such as flash memory. Alternatively, a floppy disk, a compact disc-read only memory (CD-ROM), a magneto-optical disk (MOD), and/or a digital versatile disc (DVD) may also be used. Also, in the embodiments described herein, additional input channels may be, but are not limited to, computer peripherals associated with an operator interface such as a mouse and a keyboard. Alternatively, other computer peripherals may also be used that may include, for example, but not be limited to, a scanner. Furthermore, in the exemplary embodiment, additional output channels may include, but not be limited to, an operator interface monitor.

As used herein, the terms "software" and "firmware" are interchangeable, and include any computer program stored in memory for execution by a processor, including RAM memory, ROM memory, EPROM memory, EEPROM memory, and non-volatile RAM (NVRAM) memory. The above memory types are examples only, and are thus not limiting as to the types of memory usable for storage of a computer program.

The systems and methods described herein are not limited to the specific embodiments described herein, but rather, components of the systems and/or steps of the methods may be utilized independently and separately from other components and/or steps described herein.

This written description uses examples to provide details on the disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A drive circuit for an electric motor, said drive circuit comprising:
an inverter configured to supply variable frequency current to the electric motor over a first duration, wherein said inverter is further configured to disable supply of the variable frequency current at expiration of the first duration;
a solid state switch configured to begin supplying line frequency current to the electric motor after said inverter is disabled at the expiration of the first duration and before the variable frequency current in the electric motor decays below a current threshold and a motor speed falls below a threshold speed;
a contactor coupled in parallel with said solid state switch and configured to supply the line frequency current to the electric motor over a second duration beginning when said contactor closes after the expiration of the first duration; and
a bypass switch configured to route the variable frequency current from said inverter to a start winding of the motor during the first duration and to route the line frequency current to the start winding via a capacitor after the expiration of the first duration.

2. The drive circuit of claim 1, wherein said solid state switch comprises a triode for alternating current (TRIAC).

3. The drive circuit of claim 1, wherein said solid state switch is further configured to disable supply of the line frequency current through said solid state switch over the second duration.

4. The drive circuit of claim 1, wherein said solid state switch is further configured to close after supply of the variable frequency current from said inverter is disabled, and to open after said contactor closes.

5. The drive circuit of claim 1, wherein said contactor is further configured to commutate within two cycles of the line frequency current.

6. The drive circuit of claim 5, wherein commutation of said contactor defines a transition duration, beginning at the expiration of the first duration and extending at least partially into the second duration, during which said solid state switch is commutated, wherein said solid state switch is further configured to commutate before the variable frequency current decays from windings of the electric motor and before motor speed falls below a threshold speed.

7. A permanent split capacitor (PSC) motor, comprising:
a plurality of windings comprising a start winding; and
a drive circuit coupled to said plurality of windings, comprising:
an inverter configured to supply variable frequency current to said plurality of windings over a first duration when said inverter is enabled, wherein said inverter is further configured to disable supply of the variable frequency current at expiration of the first duration;
a solid state switch configured to begin supplying line frequency current to said plurality of windings after said inverter is disabled at an expiration of the first duration and before the variable frequency current in said plurality of windings decays below a current threshold and a motor speed falls below a threshold speed;
a contactor coupled in parallel with said solid state switch and configured to supply the line frequency current to said plurality of windings after said inverter is disabled; and
a bypass switch configured to route the variable frequency current from said inverter to said start winding during the first duration and to route the line frequency current to said start winding via a capacitor after the expiration of the first duration.

8. The PSC motor of claim 7, wherein said drive circuit is configured to open said solid state switch after said contactor is closed and conducting the line frequency current, and within ten cycles of the line frequency current.

9. The PSC motor of claim 7, wherein said contactor comprises a mechanical contactor configured to commutate within two cycles of the line frequency current.

10. The PSC motor of claim 9, wherein said plurality of windings are configured to conduct the variable frequency current for no more than one cycle of the line frequency current after said inverter is disabled.

11. The PSC motor of claim 10, wherein said solid state switch is further configured to commutate in no more than three millisecond.

12. The PSC motor of claim 9, wherein said solid state switch comprises a triode for alternating current (TRIAC) configured to withstand at least two cycles of the line frequency current in an over-current condition.

13. A method of operating a permanent split capacitor (PSC) motor, said method comprising:
supplying, by an inverter, a variable frequency current to windings of the PSC motor;
disabling supply of the variable frequency current, wherein disabling supply of the variable frequency current comprises receiving a control signal at the inverter and disabling output of the variable frequency current from the inverter in response to the control signal;
closing a solid state switch after disabling supply of the variable frequency current to supply line frequency current to the windings before the variable frequency current in the windings decays below a current threshold and before a motor speed falls below a threshold speed;
closing a contactor after disabling supply of the variable frequency current to supply the line frequency current to the windings;
opening the solid state switch after the contactor is closed to redirect the line frequency current through the contactor; and
actuating a bypass switch to provide the line frequency current to a start winding of the PSC motor via a capacitor after disabling the supply of variable frequency current.

14. The method of claim 13, wherein supplying the variable frequency current comprises:
supplying line frequency current to an inverter;
converting the line frequency current to the variable frequency current; and
supplying the variable frequency current from the inverter.

15. The method of claim 13, wherein closing the solid state switch and closing the contactor are initiated upon disabling the supply of the variable frequency current.

16. The method of claim 15, wherein closing the contactor comprises commutating a mechanical contactor over a duration of up to two cycles of the line frequency current.

17. The method of claim 16, wherein closing the solid state switch comprises commutating the solid state switch over a duration of no more than three millisecond.

18. The method of claim 13, wherein opening the solid state switch occurs within ten cycles of the line frequency current from closing the solid state switch.

* * * * *